(12) United States Patent
Baburao et al.

(10) Patent No.: US 8,906,149 B1
(45) Date of Patent: Dec. 9, 2014

(54) SYSTEM FOR CO₂ CAPTURE WITH IMPROVED STRIPPER PERFORMANCE

(71) Applicant: ALSTOM Technology Ltd, Baden (CH)

(72) Inventors: Barath Baburao, Knoxville, TN (US); Jonathan W. Leister, Manvel, TX (US); Frederic Vitse, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/468,785

(22) Filed: Aug. 26, 2014

Related U.S. Application Data

(62) Division of application No. 12/732,961, filed on Mar. 26, 2010, now Pat. No. 8,845,789.

(60) Provisional application No. 61/164,944, filed on Mar. 31, 2009.

(51) Int. Cl.
*B01D 53/14* (2006.01)
*B01D 47/00* (2006.01)

(52) U.S. Cl.
CPC .................. *B01D 53/1425* (2013.01)
USPC ............ 96/243; 95/178; 95/179; 95/180; 95/183; 95/193; 95/209; 95/227; 95/228; 95/236; 423/228

(58) Field of Classification Search
None
See application file for complete search history.

(56) References Cited

U.S. PATENT DOCUMENTS

| | | | |
|---|---|---|---|
| 2,487,576 A | 11/1949 | Meyers | |
| 2,608,461 A | 8/1952 | Frazier | |
| 3,255,233 A | 6/1966 | Kunze | |
| 3,563,696 A | 2/1971 | Benson | |
| 3,896,212 A | 7/1975 | Eickmeyer | |
| 4,152,217 A | 5/1979 | Eisenberg et al. | |
| 4,364,915 A | 12/1982 | Proctor | |
| 4,405,585 A | 9/1983 | Sartori et al. | |
| 5,145,658 A | 9/1992 | Chao | |
| 5,378,442 A | 1/1995 | Fujii et al. | |
| 6,071,484 A | 6/2000 | Dingman, Jr. et al. | |
| 7,488,463 B2 | 2/2009 | Iijima et al. | |
| 8,080,089 B1 | 12/2011 | Wen et al. | |
| 2004/0253159 A1 | 12/2004 | Hakka et al. | |
| 2006/0032377 A1 | 2/2006 | Reddy et al. | |
| 2008/0072762 A1 | 3/2008 | Gal | |
| 2008/0184887 A1 | 8/2008 | Mak | |
| 2008/0210092 A1 | 9/2008 | Buckles et al. | |
| 2010/0229723 A1 | 9/2010 | Gelowitz et al. | |
| 2010/0267123 A1 | 10/2010 | Wibberley | |
| 2011/0088553 A1 | 4/2011 | Woodhouse et al. | |

FOREIGN PATENT DOCUMENTS

| | | |
|---|---|---|
| EP | 0 502 596 A1 | 9/1992 |
| EP | 1 695 756 A1 | 8/2006 |
| EP | 1 759 756 A1 | 3/2007 |
| GB | 871207 A | 6/1961 |
| WO | 2008/094777 A1 | 8/2008 |
| WO | 2009/112518 A1 | 9/2009 |

*Primary Examiner* — Duane Smith
*Assistant Examiner* — Pankti Patel
(74) *Attorney, Agent, or Firm* — Cynthia W. Flanigan

(57) ABSTRACT

The present application relates to a system for removal of gaseous contaminants from a gas stream. The system includes an absorber for contacting the gas stream with a wash solution to form a used wash stream, a regenerator for regenerating the used wash solution, a reboiler and at least two heat exchangers in fluid communication with the absorber, regenerator and reboiler.

6 Claims, 2 Drawing Sheets

SYSTEM FOR $CO_2$ CAPTURE WITH IMPROVED STRIPPER PERFORMANCE

CROSS-REFERENCE

This application claims priority to, and is a divisional application of, U.S. application Ser. No. 12/732,961 filed Mar. 26, 2010, which in turn claims priority to U.S. Provisional Patent Application Ser. No. 61/164,944 filed Mar. 31, 2009, both of which are hereby incorporated by reference in their entireties.

TECHNICAL FIELD

The present application relates to methods and systems for removal of gaseous contaminants from gas streams.

BACKGROUND

In conventional industrial technologies for gas purification, impurities, such as $H_2S$, $CO_2$ and/or COS are removed from a gas stream such as flue gas, natural gas, syngas or other gas streams by absorption in a liquid solution, e.g. in a liquid solution comprising an amine compound.

Used liquid solution is subsequently regenerated in a regenerator column to release the impurities comprised in the solution, typically by countercurrent contacting with steam. The steam needed for regeneration is typically produced by boiling the regenerated liquid solution in a reboiler, located at the bottom at the regenerator column. In addition, reboiling may provide further release of impurities comprised in the liquid solution.

In conventional absorption-regeneration processes as described above, regenerated and reboiled liquid solution is typically re-used in another absorption cycle. The reboiled solution may however have a temperature as high as 100-150° C. To enable efficient absorption, liquid solutions based on amine compounds typically requires cooling before being passed to another round of absorption. Cooling has conventionally been accomplished by heat-exchange with used liquid solution from absorption.

The energy produced by the reboiler is not only required for regeneration, but also at other locations in an absorption-regeneration process. In general, the energy requirements of a conventional gas purification process are of three types: binding energy, stripping energy and sensible heat. Binding energy is required for breaking the chemical bond formed between the impurities and the liquid solution, whereas stripping energy is required for production of the steam needed for releasing the impurities from the liquid solution. Sensible heat is in turn needed for heating of the liquid solution prior to regeneration. In conventional systems and processes, part of the produced energy may be lost for example in the system coolers, which reduce the temperature at specified locations in the system, e.g. the cooler located near the absorber inlet for cooling return wash solution before feeding it to the absorber. Moreover, energy may be lost in condensers located at the top of the absorber, regenerator etc, and in the form of water vapor exiting the process, mostly at the top of the regenerator where water vapor is present in the purified $CO_2$ gas.

Thus, gas removal, and in particular regeneration, is an energy intensive process. Reduction of energy requirements at different parts of a gas purification process could potentially reduce the total energy required by the process.

U.S. Pat. No. 4,152,217 discloses an absorption-regeneration process with reduced overall heat energy requirements. The process comprises a split-flow arrangement in that the spent impurity-enriched solution, resulting from absorption, is split into two streams. The first stream is directed to the top of the regenerator column without being heated. The second stream is, after being heated by heat-exchange with the hot lean stream from the bottom of the regenerator column, fed to a lower, intermediate point in the regenerator column.

In WO09/112518, a process for removal of $CO_2$ is disclosed wherein the absorbing liquid enriched in $CO_2$ is heated by heat-exchange prior to being fed to a regenerator column. Before being subjected to heat-exchange, the absorbing liquid is split into two streams. The first stream is heated by heat-exchange with regenerated liquid, and the second stream is heated by heat-exchange with stripping gas enriched in $CO_2$ from the top of the regenerator column.

EP 1 759 756 discloses a CO2 recovery process wherein a solution rich in $CO_2$ is regenerated in a regenerator tower comprising a heating member. The heating member heats the rich solution in the regenerator tower with steam generated when regenerating the rich solution in the regenerator tower.

Although various improvements of conventional gas purification technologies are known, there is an ever-existing desire to further improve these technologies, in particular in respect of energy consumption.

SUMMARY

The above drawbacks and deficiencies of the prior art are overcome or alleviated by a process for removal of gaseous contaminants from a gas stream comprising contacting the gas stream with a wash solution to remove gaseous contaminants from the gas stream by absorption into the wash solution; and regenerating the used wash solution to remove gaseous contaminants from the used wash solution, to provide a regenerated wash solution and a gas comprising removed contaminants, wherein in a first regeneration stage the gas comprising removed contaminants is cooled to minimize loss of water vapor from the regeneration step.

In this context, the terms "heated" and "cooled" are intended to refer to relative temperatures of liquids, solutions or streams in gas purification processes or systems. For example, a liquid may be referred to as a "heated" liquid following a heating step as compared to the relative temperature of the liquid prior to heating and/or, accordingly, as compared to the relative temperature of a liquid, solution or stream, at a corresponding location in a process lacking the heating step. The term "cooled" is correspondingly intended to refer to the relative temperature of a liquid, solution or stream after a cooling step as compared to the temperature of the liquid, solution or stream before cooling or as compared to a liquid, solution or stream at a corresponding location in a process lacking the cooling step.

As used herein, "heat-exchanging" or "heat-exchange" imply a process step wherein heat is deliberately transferred from one medium to another medium. Heat-exchange results in one medium leaving the process step cooler than previously and one medium leaving the process step warmer than previously, i.e. before the process step. Heat-exchange may be direct, wherein the two media physically meet, or indirect, wherein the media are separated, e.g. by a solid wall allowing heat transfer.

As used herein, "regeneration stage" does not mean an equilibrium stage, but a step in the regeneration process.

As outlined above, cooling here means cooled compared to the temperature of a similar operation in a conventional process. Thus, cooling the gas comprising the contaminants removed from the used wash solution in a first regeneration stage means providing a gas having a lower temperature as compared to in a conventional process. By such cooling in a first regeneration stage, such as in an upper part of a regenerator, loss of water vapor from regeneration is minimized. In other words, water vapor is condensed before leaving the regeneration step and, as a consequence, stripping energy is minimized. Cooling may however lead to re-absorption of a small amount of removed contaminants into the wash solution. As the used wash solution in the first regeneration stage is rich in contaminants, the extent of re-absorption will be low. However, the temperature of the gas comprising removed contaminants may be adapted in order to balance the extent of re-absorption and the extent of condensation.

In one embodiment, the used wash solution is cooled before being passed to regeneration. Thus, the used wash solution is cooled as compared to the temperature of a used wash solution in a conventional process. As an example, the used wash solution may have a temperature of below 115° C. In this way, the cooled used wash solution may provide the cooling of the gas comprising contaminants in the first regeneration stage.

In another aspect, there is provided a process for removal of gaseous contaminants, such as $CO_2$, from a gas stream, comprising a) contacting a gas stream comprising gaseous contaminants with a wash solution, to remove gaseous contaminants from the gas stream by absorption into the wash solution;

b) passing used wash solution resulting from step a) to regeneration;

c) regenerating used wash solution by removal of gaseous contaminants from the wash solution, to provide a regenerated wash solution and a gas comprising removed contaminants, wherein regeneration optionally comprises a set of consecutive regeneration stages;

d) passing the regenerated wash solution to reboiling;

e) reboiling the regenerated wash solution for further removal of gaseous contaminants from the wash solution, to provide a reboiled wash solution;

f) returning the reboiled wash solution to step a);

wherein during step f), the return wash solution is subjected to heat-exchanging with regenerated wash solution of step d) in a first heat-exchanging step, to heat the regenerated wash solution; and heat-exchanging with used wash solution of step b) in a second heat-exchanging step, to heat the used wash solution.

Following reboiling of step e), the reboiled wash solution, referred to as the return wash solution, is returned to the absorption step, where it once again is contacted with a gas stream containing gaseous contaminants. During the return passage, the return wash solution is subjected to heat-exchanging in two consecutive heat-exchanging steps. First, transfer of heat is allowed for between the return wash solution, originating from reboiling, and the regenerated wash solution by the heat-exchanging of step d). Thus, this provides a cooled return wash solution and a heated regenerated wash solution. By this first heat-exchange, heat energy provided to the process by reboiling is to a greater extent kept in the hot region of the process, i.e. the reboiling region and the regeneration region closest to the reboiling region. This may reduce the amount of heating required in the reboiling step for the regenerated wash solution. In addition, the return wash solution leaves the hot region cooler, which may reduce the cooling required before contacting the solution with a gas stream comprising gaseous contaminants in the next process cycle.

In a second heat-exchanging step, the cooled return wash solution is heat-exchanged with used wash solution resulting from the absorption step. This allows for heat transfer between the used wash solution and the return wash solution to cool the return wash solution prior to the next absorption round of step a). The used wash solution resulting from the second heat-exchanging is heated, although to a less extent than in a conventional process. As a consequence, the less heated used wash solution may reduce the temperature for regeneration compared to conventional regeneration temperatures, In particular, the temperature in the beginning of the regeneration, i.e. the temperature of the first regeneration stages, typically in the regenerator overhead, may be reduced. This may help to reduce stripping energy losses during regeneration, e.g. by minimizing the amount of water vapor escaping from the regeneration step.

According to examples as illustrated herein, there is provided a process, wherein in a first regeneration stage, the used wash solution cools the gas comprising removed contaminants to minimize water vapor loss. Such cooling provides reduction of water vapor loss from regeneration. This may in turn enable recycling of the stripping heat back to the regeneration and reboiling steps in the form of condensed water. A larger degree of recycling of stripping heat provides for larger energy recycling to the hotter region of the process, which may reduce the overall reboiler duty. Altogether, the temperature differential between the beginning and the end of the regeneration step is increased as compared to conventional processes, which may allow for improved stripping with limited water vapor loss.

According to examples as illustrated herein, there is provided a process comprising a third heat-exchanging step between the first and second heat-exchanging steps. In particular, such a process further comprises withdrawing a first portion of used wash solution resulting from the second heat-exchanging step; and between the first and second heat-exchanging steps, subjecting the return wash solution to heat-exchanging with the withdrawn first portion of used wash solution in a third heat-exchanging step, to heat the used wash solution. The portion withdrawn may for example constitute 10-90%, such as 50-90%, such as 75-90%, of the used wash solution resulting from the second heat-exchanging step. It is understood that used wash solution may be divided in any suitable number of portions.

In one example of a process for removal of gaseous contaminants, used wash liquid remaining after withdrawal of the first portion is passed to regeneration. Passing a smaller portion of used wash solution to regeneration may lower the flow rate of the solution in regeneration resulting in the lowering of auxiliary energy consumption, i.e. energy consumption associated with pumps, valves etc.

A third heat-exchanging step as described above may thus enable further cooling of the return wash solution. This affects the second heat-exchanging step, which, as a result, provides a less heated used wash solution as compared to a conventional process. Consequently, the portion of used wash solution which is passed to regeneration, referred to as the second portion or the remaining portion, may further reduce the temperature in the regeneration step, e.g. in a first regeneration stage. In particular, the temperature of the gas mixture leaving regeneration may be further reduced which may further reduce loss of water vapor from the regeneration step. In this way, stripping energy may also be further reduced.

According to other examples of a process as illustrated herein, there is further provided a process comprising passing the first portion of used wash solution resulting from the third heat-exchanging step to reboiling; and reboiling the first portion of used wash solution for removal of gaseous contaminants from the used wash solution, to provide a reboiled wash solution. The thus heated first portion of used wash solution is passed to reboiling, where gaseous contaminants and water vapor are released from the solution. The relatively higher temperature of the wash solution entering the reboiling step enhances the removal of gaseous contaminants from that reboiler area of the process.

During the passage to reboiling, the first portion of used wash solution may be combined with the regenerated wash solution of step d). Thus, the first portion of used wash solution may e.g. be mixed with the regenerated wash solution and subsequently subjected to heat-exchanging in the first heat-exchanging step. The first heat-exchanging step hence provides a heated mixture comprising the first portion of used wash solution and the regenerated wash solution. The mixture is subsequently subjected to reboiling for removal of gaseous contaminants from the mixture and for production of steam.

Alternatively, the first portion of used wash solution may, after heating in the third heat-exchanging step as described above, be passed to regeneration where it may be regenerated for removal of gaseous contaminants, to provide a regenerated wash solution. The first portion of used wash solution may for example be passed to a regeneration stage downstream of the regeneration stage to which the second portion of used wash solution is passed. In particular, the first portion of used wash solution may be regenerated in one or more regeneration stage(s) representing the lower and hotter part of regeneration.

Features mentioned in respect of the above aspects may also be applicable to the aspects as described below.

According to other aspects as illustrated herein, there is provided a gas purification system for removal of gaseous contaminants, such as $CO_2$, from a gas stream, comprising an absorber for receiving a gas stream comprising gaseous contaminants and contacting it with a wash solution;

a regenerator for regenerating used wash solution by releasing gaseous contaminants from the wash solution;

a reboiler for reboiling regenerated wash solution to release gaseous contaminants from the wash solution and for steam generation;

a first heat-exchanger for heat transfer between a reboiled wash solution and a regenerated wash solution, the heat-exchanger being arranged for receiving reboiled wash solution from the reboiler and for receiving regenerated wash solution from the regenerator; and a second heat-exchanger for heat transfer between a reboiled wash solution from the first heat-exchanger and used wash solution from the absorber, the heat-exchanger being arranged for receiving used wash solution from the absorber and for receiving reboiled wash solution from the first heat-exchanger;

wherein the absorber is arranged for receiving reboiled wash solution from the second heat-exchanger; the reboiler is arranged for receiving regenerated wash solution from the first heat-exchanger; and the regenerator is arranged for receiving used wash solution from the second heat-exchanger.

In the first heat-exchanger, heat transfer is provided for between a reboiled wash solution, also denoted a return wash solution, and a regenerated wash solution. In the second heat-exchanger, the reboiled wash solution from the first heat-exchanger is heat-exchanged a second time. Thus, the second heat-exchanger provides heat transfer between the reboiled wash solution from the first heat-exchanger and used wash solution from the absorber. In the first heat-exchanger, the reboiled return wash solution gives up heat to the regenerated wash solution and in the second heat-exchanger the reboiled return wash solution gives up heat to the used wash solution. This enables recovery of heat from the hot reboiled wash solution, and at the same time recovery of heat from the vapor in the regenerator. Thus, heat is kept in the hot region of the system and the overall heat requirements of the system may be reduced.

Further, the regenerator receives used wash solution from the second heat-exchanger. The wash solution is heated from heat-exchanging, but less heated compared to in conventional systems. This may in turn result in a reduced regenerator temperature compared to the regenerator temperature of a conventional system. The regenerator may for example be arranged for receiving used wash solution at an upper part of the regenerator, and thus in particular the temperature of the upper part of the regenerator may be reduced in order to control the temperature of the regenerator overhead.

In one example of a gas purification system, the system further comprises a third heat-exchanger for heat transfer between reboiled wash solution from the first heat-exchanger and a first portion of used wash solution from the second heat-exchanger, wherein the third heat-exchanger is arranged for receiving reboiled wash solution from the first heat-exchanger and for receiving a first portion of used wash solution from the second heat-exchanger. Such a system may for example comprise a flow splitter for dividing the used wash solution into portions, such as two, three or more portions. The first portion is received by the third heat-exchanger whereas the remaining used wash solution may be received by the regenerator. By passing only a portion of the used wash solution to the regenerator, the total volume received by the regenerator is reduced, which in turn may reduce the flow rate in the regenerator and, in addition, the regenerator size. This may however have some impact on the reboiler sizing.

In a system comprising a third heat-exchanger as described above, the second heat-exchanger may be arranged for receiving reboiled wash solution from the third heat-exchanger; and the first heat-exchanger may be arranged for receiving the first portion of used wash solution from the third heat-exchanger. Such a system may additionally comprise a mixer for mixing the first portion of used wash solution from the third heat-exchanger with the regenerated wash solution, to provide a mixed solution. This mixed solution may subsequently be directed to the first heat-exchanger, which in this case is arranged to receive a mixed solution from the mixer. After heat transfer in the first heat-exchanger as previously described, the mixture may be passed to reboiling in the reboiler for removal of gaseous contaminants and for production of steam to drive the regenerator.

In another example of a gas purification system, the regenerator is arranged for receiving the portion of used wash solution from the third heat-exchanger; and the second heat-exchanger is arranged for receiving reboiled wash solution from the third heat-exchanger. Here, the regenerator receives both the first portion of used wash solution as well as the remaining used wash solution. In one example, the remaining wash solution, in one or more portions, is received at an upper part of the regenerator, whereas the first portion is received at a bottom part of the regenerator.

The above described and other features are exemplified by the following figures and the detailed description.

BRIEF DESCRIPTION OF THE DRAWINGS

Referring now to the Figures, which are exemplary embodiments, and wherein the like elements are numbered alike.

DETAILED DESCRIPTION

Figure 1:
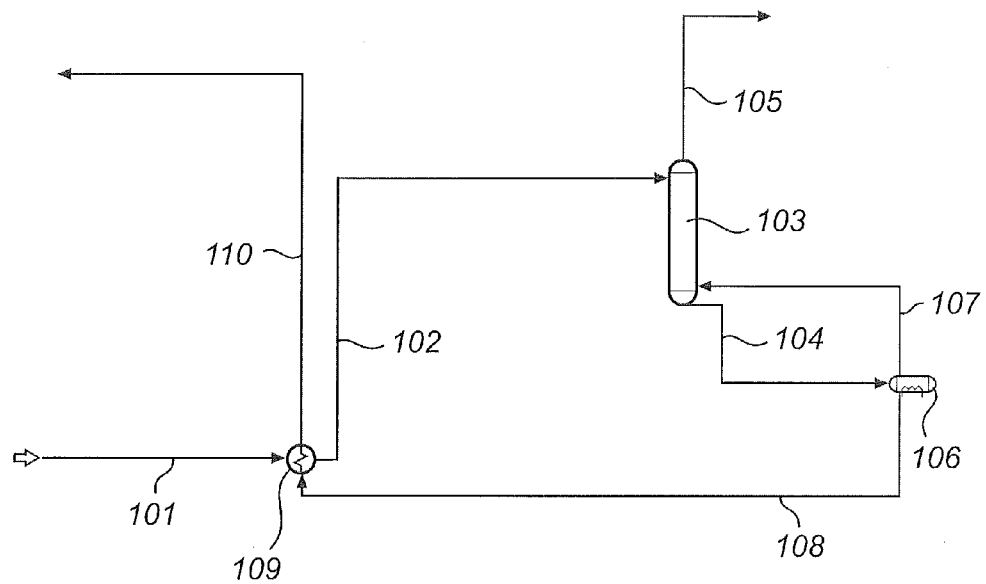
FIG. 1 is a diagram generally depicting a conventional amine-based system for removal of $CO_2$ from a gas stream.

FIG. 1 illustrates a conventional system for removal of $CO_2$ from a gas stream. The system comprises an absorber (not shown), wherein a gas stream containing $CO_2$ is contacted, for example in a countercurrent mode, with a wash solution, such as an amine-based wash solution. In the absorber, $CO_2$ from the gas stream is absorbed in the wash solution. Used wash solution enriched in $CO_2$ leaves the absorber via line 101. The $CO_2$-enriched wash solution is passed via a heat-exchanger 109 and line 102 to a regenerator 103, wherein the used wash solution is stripped of $CO_2$ by breaking the chemical bond between the $CO_2$ and the solution. Regenerated wash solution leaves the regenerator bottom via line 104. Removed $CO_2$ and water vapor leaves the process at the top of the regenerator via line 105. In addition, a condenser may be arranged at the top of the regenerator to prevent water vapor from leaving the process.

Regenerated wash solution is passed to a reboiler 106 via line 104. In the reboiler, located at the bottom of the regenerator, the regenerated wash solution is boiled to generate vapor 107 which is returned to the regenerator to drive the separation of $CO_2$ from wash solution. In addition, reboiling may provide for further $CO_2$ removal from the regenerated wash solution.

Following reboiling, the reboiled and thus heated wash solution is via line 108 passed to a heat-exchanger 109 for heat-exchanging with the used wash solution from the absorber. Heat-exchanging allows for heat transfer between the solutions, resulting in a cooled reboiled wash solution and a heated used wash solution. The reboiled and heat-exchanged wash solution is thereafter passed to the next round of absorption in the absorber. Before being fed to the absorber, the wash solution 110 may be cooled to a temperature suitable for absorption. Accordingly, a cooler may be arranged near the absorber solvent inlet (not shown).

According to examples as illustrated herein, the gas stream comprising gaseous contaminants may be a natural gas stream or a flue gas stream. In other examples of processes and systems as described herein, the gaseous contaminants may be acidic contaminants such as $CO_2$, $H_2S$ etc.

A wash solution used for removal of gaseous contaminants may for example be an amine-based wash solution. Examples of amine-based wash solutions include, but are not limited to, amine compounds such as monoethanolamine (MEA), diethanolamine (DEA), methyldiethanolamine (MDEA), diisopropylamine (DIPA) and aminoethoxyethanol (diglycolamine) (DGA). The most commonly used amines compounds in industrial plants are the alkanolamines MEA, DEA, MDEA and some blends of conventional amines with promoters, inhibitors etc. However, it is understood that the systems and processes as herein disclosed may be applied to any solution involved in a process with an absorption/regeneration scheme.

Figure 2:
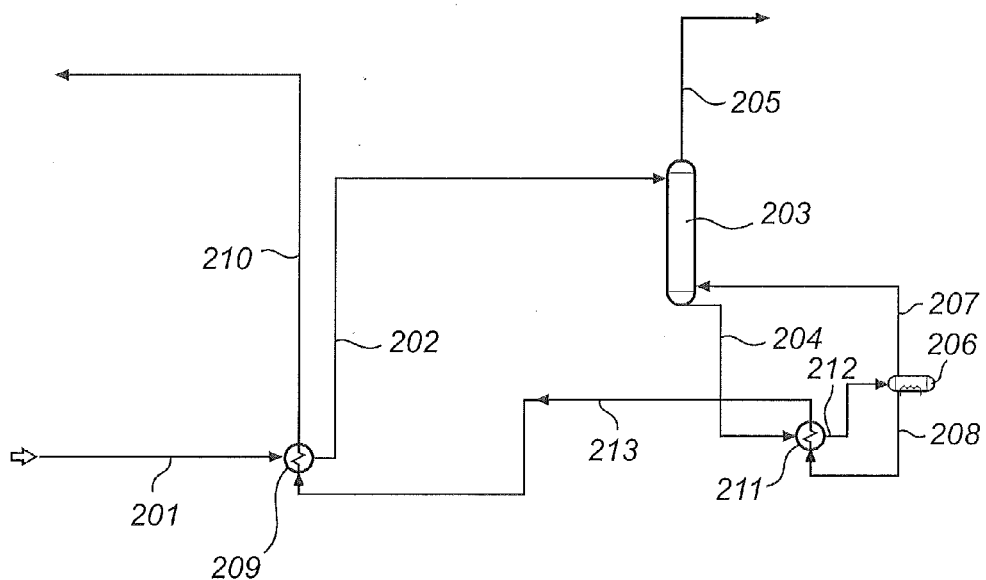
FIG. 2 is a diagram generally depicting an example of a system for removal of $CO_2$ from a gas stream as disclosed herein.

FIG. 2 is a schematic representation of a system for removal of $CO_2$ from a gas stream as described herein. The system comprises an absorber (not shown) for receiving a gas stream comprising $CO_2$ and contacting it with a wash solution. $CO_2$ is removed from the gas stream by absorption into the wash solution. Used wash solution is subsequently passed via line 201 to a heat-exchanger 209.

The heat-exchanger used for heat transfer between two solutions in a system and a process as disclosed herein may for example be a countercurrent heat-exchanger. Examples of heat-exchangers include, but are not limited to, shell-and-tube heat-exchangers, and plate and frame heat-exchangers.

From the heat-exchanger, used wash solution is passed via line 202 to a regenerator 203. As described above, the used wash solution is stripped of $CO_2$ in the regenerator and removed $CO_2$ leaves the regenerator via line 205. The regenerator may for example be a column, such as a packed bed column or a column comprising trays.

Regenerated wash solution leaves the regenerator bottom via line 204 and is passed to reboiling via a heat-exchanger 211. In the heat-exchanger, the regenerated wash solution is heat-exchanged with reboiled wash solution from the reboiler 206. Thus, heat-exchanging provides a cooled reboiled wash solution 213 as compared to the temperature of wash solution 208. In addition, heat-exchanging in heat-exchanger 211 provides a heated regenerated wash solution 212, which is passed to reboiling in the reboiler 206, as compared to the temperature of the regenerated wash solution 204 coming from the regenerator. In this way, heat energy is kept in the hot region of the system, i.e. the reboiler and the lower part of the regenerator.

After heat-exchange in heat-exchanger 211, the regenerated wash solution is passed to reboiling via line 212. In the reboiler 206, the regenerated wash solution is boiled to produce vapor 207 to drive the separation process in the regenerator 203. It is to be understood that any type of reboiler may be used in the herein disclosed system. Examples of reboilers include, but are no limited to, horizontal/vertical thermosyphon type reboilers, and kettle type reboilers.

Following the first heat-exchanging, the reboiled wash solution is returned to the absorber via a second heat-exchanger 209. In similarity with what is described above, the return wash solution 213 is heat-exchanged with the used wash solution 201 in the heat-exchanger. The two consecutive heat-exchangers lower the temperature of the return wash solution to be recycled to the absorber as compared to the wash solution 110 recycled to the absorber in FIG. 1. The lower temperature of the return wash solution 213 may provide for more efficient heat-exchanging in heat-exchanger 209, as compared to heat-exchanging in the corresponding heat-exchanger 109 in FIG. 1. If, for example, the return wash solution is recycled to the next round of absorption by pumping, the cooled return wash solution may reduce the risk of cavitation during pumping.

More efficient heat-exchanging in the second heat-exchanger results in a used wash solution 202 with lower temperature as compared to the used wash solution 102. Lowered temperature of used wash solution 202 may, as a consequence, reduce the temperature at the regenerator 203. As a result of this, the temperature downstream of the heat-exchanger 209 will be lower compared to the temperature downstream the heat-exchanger 109, which in turn may reduce the cooling duty in a cooler arranged near the absorber solvent inlet.

Figure 3:
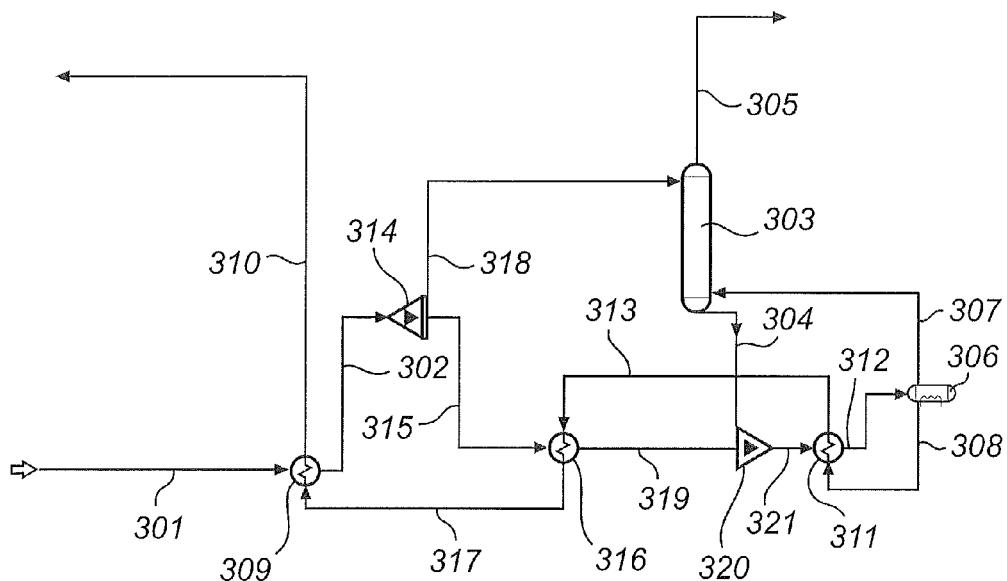
FIG. 3 is a diagram generally depicting an example of a system for removal of $CO_2$ from a gas stream as disclosed herein.

FIG. 3 is a schematic representation of a system for removal of $CO_2$ from a gas stream as described herein. Components that are the same as those in FIG. 2 are assigned with the corresponding reference numerals, and explanation thereof is omitted. Reference numerals where the two last figures (e.g. 2##, 3##) are the same represent the same components.

During the passage to regeneration, the wash solution is here divided in two portions in flow splitter 314. A first portion of the used wash solution 315 is passed to a third heat-exchanger 316, located between the first 311 and the second heat-exchanger 309. In the third heat-exchanger, the return wash solution 313 is subjected to heat-exchanging with the first portion of used wash solution 315, to cool the return wash solution. The first portion of used wash solution may amount to 10-90%, such as 50-90%, or such as 75-90% of the volume of used wash solution resulting from the second heat-exchanger.

Following heat-exchanging in the third heat-exchanger, the return wash solution is, via line 317, passed to the second heat-exchanger 309 for heat-exchanging with used wash solution 301 from the absorber. Thus, the return wash solution is here subjected to three consecutive heat-exchanging steps, in which heat is recovered from the return wash solution. In addition, the temperature of the used wash solution 302 is affected, coming out of the second heat-exchanger cooler than in systems lacking the features described herein.

The second portion of used wash solution 318 is passed to regeneration, where it, due to its reduced temperature compared to conventional systems, reduces the temperature of the gas mixture 305 leaving the regenerator 303. As a consequence, the amount of water vapor leaving the regenerator may be decreased, since water condenses and drains back to the bottom of the regenerator 303. In this way, the stripping heat may be recycled to the regenerator 303 and reboiler 306 in the form of condensed water. When a larger amount of energy is recycled to the hotter part of the system (regenerator and reboiler), the overall reboiler duty may be reduced.

Furthermore, the flow rate of the second portion of wash solution entering the regenerator may be reduced depending on the size of the second portion, i.e. split ratio of the solution in 314. If a minor portion is passed to regeneration, the regenerator size may be significantly decreased. In this case the major portion of used wash solution is passed to reboiling, via heat-exchanging, and thus the reboiler size may increase due to increased flow rate through the reboiler Regenerated wash solution stripped of $CO_2$ leaves the regenerator via line 304. In one example of a system as illustrated herein, the regenerated wash solution is combined with the first portion of used wash solution 319 from the third heat-exchanger 316. Combination may for example take place in a mixer 320, and the resulting mixture may subsequently be passed to the first heat-exchanger 311 via line 321. In the first heat-exchanger, the mixture is subjected to heat-exchanging with the reboiled wash solution 308, whereafter the heated mixture 312 itself is fed to the reboiler 306 for reboiling. In the reboiler, further $CO_2$ removal may take place. In addition, vapor 307 is produced for driving the regeneration.

Figure 4:
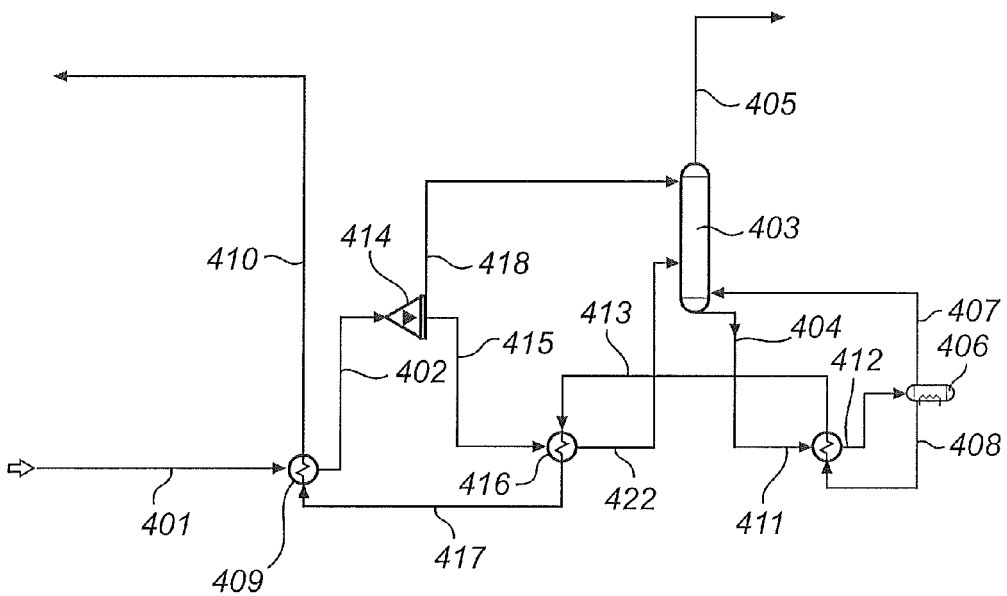
FIG. 4 is a diagram generally depicting an example of a system for removal of $CO_2$ from a gas stream as disclosed herein.

FIG. 4 is a schematic representation of a system for removal of $CO_2$ from a gas stream as described herein. Once again, components that are the same as those as previously described are assigned with the same reference numerals.

In the third heat-exchanger 416, the first portion of used wash solution is heat-exchanged with the return wash solution from the first heat-exchanger 411. Heat-exchanging in the third heat-exchanger enables heat recovery from the return wash solution 417, which comes out of the heat-exchanger cooler than before heat-exchanging.

In the third heat-exchanger 416, heat is recovered in the first portion of used wash solution 422. This portion of wash solution is fed to the regenerator 403. The heated portion of used wash solution may be fed to the regenerator at a middle or bottom part of the regenerator. If the regenerator for example is a column comprising a number of trays, the portion of used wash solution may e.g. be fed to the lower trays representing the hottest region of the system. It is understood that a suitable introduction level of the regenerator, or suitable regeneration stage, may depend on the split ratio of the used wash solution. The first portion, which in this example is passed to the regenerator, may comprise the major part of the used solution, such as 75-90% of the used wash solution.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLE

In the following example, energy requirements were calculated for simulations of different $CO_2$ removal processes as disclosed herein and compared to energy requirements for a simulated conventional $CO_2$ removal process. For all simulations, the following conditions were used:
Wash solution MDEA based
Regenerator pressure 50 psi
Temperature approach heat-exchanger 5° C.
(Temperature difference between the cold stream inlet and the hot stream outlet)
Lean loading 0.088 mol/mol
(Absorber inlet/reboiler outlet)
Rich loading 0.3 mol/mol
(Absorber outlet)
Energy Requirements for a Conventional Process In this example, a conventional process was simulated comprising the general steps of absorbing $CO_2$ into a MDEA based solution, regenerating the $CO_2$ enriched solution (rich solution), reboiling the regenerated solution and cooling of the reboiled solution (lean solution) in a heat-exchanger before recycling to the absorption step. Such a process is schematically represented by FIG. 1.

Conventional processes for $CO_2$ removal have an inherent efficiency of around 3-4 GJ/tonne $CO_2$ captured. The energy required by the process is provided mostly by a reboiler, located at the bottom of the regenerator. The distribution of the energy requirements for the conventional process was as presented in the table below.

TABLE 1

Process energy requirements for a conventional process

|  | % of reboiler duty |
| --- | --- |
| binding energy | 40-50 |
| sensible heat | 10-30 |
| stripping energy | 30-40 |

For this conventional process, used MDEA based solution passed to the regenerator held a temperature of approximately 115° C. The temperature of the wash solution in turn influenced the temperature at the top of the regenerator.

Energy Requirements for a First Example Process

In this first example, a process for $CO_2$ removal similar to the one schematically depicted in FIG. 2 was simulated. The simulated process thus comprised a first and a second heat-exchanger for recovery of heat from the hot reboiled return solution. This scheme with two heat-exchangers also affected the temperature of the rich MDEA based solution reaching the top of the regenerator. The temperature of the rich solution at the regenerator top was here lower as compared to the rich solution at the corresponding location in the conventional process described above.

Compared to the conventional process as described above, the reboiler duty was now reduced to 2.18 GJ/tonne $CO_2$ captured. The distribution of energy requirements was as presented below.

TABLE 2

Process energy requirements for a first example process

|  | % of reboiler duty |
| --- | --- |
| binding energy | ca 70 |
| sensible heat | ca 10 |
| stripping energy | ca 20 |

In this example, reboiler duty was thus reduced compared to the conventional process described above, and the energy requirements were redistributed. The binding energy, i.e. the energy required for breaking the chemical bond between $CO_2$ and the wash solution here required most of the reboiler duty.

Energy Requirements for a Second Example Process

In the second example, a process similar to the one schematically illustrated in FIG. 3 was simulated. Compared to the first example process, the second example process also comprised a third heat-exchanger between the first and second heat-exchangers. This third heat-exchanger allowed for even further heat recovery from the return lean solution. Thus, the return lean solution subjected to heat-exchanging in the second heat-exchanger was thus cooler than the corresponding return lean solution of the above described conventional process. In consequence, the heated rich solution reaching the regenerator top was cooler as compared to the corresponding solution of the conventional process.

The process of the second example further comprised a divider for dividing rich solution into two portions. Approximately 90% of the rich solution was passed to the third heat-exchanger as described above and less than 10% was fed to the regenerator. The portion of rich solution that was heat-exchanged in the third heat-exchanger, was further, following mixing with the regenerated wash solution and heat-exchanging in the first heat-exchanger, fed to the reboiler.

Compared to the conventional process as described above, the reboiler duty of the process was reduced to 2.11 GJ/tonne $CO_2$ and the energy requirements were as shown below.

TABLE 3

Process energy requirements for a second example process

|  | % of reboiler duty |
| --- | --- |
| binding energy | ca 70 |
| sensible heat | ca 15 |
| stripping energy | ca 25 |

At the top of the regenerator, the cool wash solution with low flow rate was contacted with the gas mixture rich in $CO_2$. This might lead to a slight re-absorption of $CO_2$ at the top of the regenerator. However, since the used wash solution is already rich in absorbed $CO_2$ and since the flow rate of the solution is lowered, the amount of re-absorbed $CO_2$ may be limited. Thus, the process still allows for significant overall removal of $CO_2$. Furthermore, the re-absorbed $CO_2$ releases its binding energy (exothermic reaction) and this energy may be captured in the form of sensible heat contained in the solution flowing down the regenerator and the reboiler. Thus, this energy is not lost to the ambient, which may further reduce the reboiler needs.

Energy Requirements for a Third Example Process

In the third example, a process similar to the one schematically illustrated in FIG. 4 was simulated. The third example process differed from that in the second example in that the portion of rich solution subjected to heat-exchanging in the third heat-exchanger was fed to the bottom of the regenerator. Here, less than 10% of the rich solution was directed to the top of the regenerator while the remaining 90% was, following heat-exchanging, fed to a lower part of the regenerator.

Compared to the conventional process, the reboiler duty of this process was reduced to 1.82 GJ/tonne $CO_2$ and the energy requirements were:

TABLE 4

Process energy requirements for a third example process

|  | % of reboiler duty |
| --- | --- |
| binding energy | ca 80 |
| sensible heat | ca 15 |
| stripping energy | <5 |

This last example process showed that the binding energy represented around 80% of the total reboiler duty. With such configuration, the temperature at the top of the regenerator was drastically reduced to approximately 57° C., which is approximately 21° C. above the temperature of the rich solution coming from the absorber, which further reduced the stripping energy requirements.

Although the simulations were performed for a high pressure regenerator, similar results are expected for processes with a regenerator at lower pressure. Also, the temperature approach could probably be increased to reasonable values without greatly influencing the above energy distribution patterns.

The invention claimed is:

1. A gas purification system for removal of gaseous contaminants from a gas stream, comprising:
    an absorber for contacting a gas stream comprising gaseous contaminants with a wash solution to form a used wash solution;
    a regenerator for generating a regenerated wash solution from the used wash solution by releasing gaseous contaminants from the used wash solution;
    a reboiler for reboiling the regenerated wash solution to release gaseous contaminants to form a reboiled wash solution and steam;
    a first heat-exchanger for heat transfer between the reboiled wash solution and the regenerated wash solution;
    a second heat-exchanger for heat transfer between the reboiled wash solution from the first heat-exchanger and the used wash solution from the absorber, wherein the absorber is arranged for receiving the reboiled wash solution from the second heat-exchanger; the reboiler is arranged for receiving the regenerated wash solution from the first heat-exchanger; and the regenerator is arranged for receiving the used wash solution from the second heat-exchanger; and a third heat-exchanger for heat transfer between the reboiled wash solution from the first heat-exchanger and a first portion of the used wash solution from the second heat-exchanger; and wherein the third heat-exchanger is arranged for receiving reboiled wash solution from the first heat-exchanger and for receiving a first portion of used wash solution from the second heat-exchanger.

2. The gas purification system according to claim 1, wherein the regenerator is arranged for receiving used wash solution at an upper part of the regenerator.

3. The gas purification system according to claim 1 wherein the first portion of used wash solution is 10-90% of the used wash solution resulting from the second heat-exchanger.

4. The gas purification system according to claim 1, wherein the second heat-exchanger is arranged for receiving reboiled wash solution from the third heat-exchanger; and the first heat-exchanger is arranged for receiving the first portion of used wash solution from the third heat-exchanger.

5. The gas purification system according to claim 1, wherein the regenerator is arranged for receiving the portion of used wash solution from the third heat-exchanger; and the second heat-exchanger is arranged for receiving reboiled wash solution from the third heat-exchanger.

6. The gas purification system according to claim 5, wherein the regenerator is arranged for receiving the portion of used wash solution resulting from the third heat-exchanger at a bottom part of the regenerator.

* * * * *